PHOTOCONDUCTOR OF LEAD OXIDE AND METHOD OF MAKING

Filed Feb. 26, 1957

Inventors:
Richard W. Damon;
John R. Eshbach,
by Paul A. Frank
Their Attorney.

United States Patent Office 2,888,370

Patented May 26, 1959

2,888,370

PHOTOCONDUCTOR OF LEAD OXIDE AND METHOD OF MAKING

Richard W. Damon and John R. Eshbach, Schenectady, N.Y., assignors to General Electric Company, a corporation of New York Application February 26, 1957, Serial No. 642,378

7 Claims. (Cl. 117—201)

Figure 1:
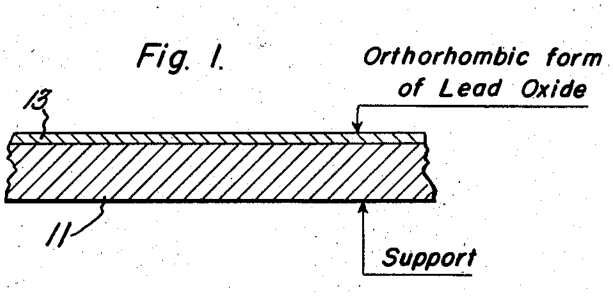

Our invention relates to improved photoconductive lead oxide films and methods of making such films.

An important application of photoconductive films is in camera tubes which impose certain electrical and mechanical requirements on the film for proper operation. A film for such an application must be able to "store" the charge for a number of television frame times, necessitating that the film resistivity should be greater than about $10^{11}$ ohm-centimeters. The film should have a rather high absorption coefficient for the type of radiation to be detected so as to exhibit appreciable photoconductivity and sensitivity. Also, in order to be compatible with conditions encountered in camera tubes, the film should be chemically stable, should not exhibit outgassing, and should not deteriorate under electron bombardment. In addition, in order for a camera tube to be suitable for use in the display of moving objects, a fast photoconductive rise and decay time or response time is necessary for the realization of unblurred images.

Conventional lead oxide films of the red, tetragonal crystallite form do not exist the rise and decay time nor resistivity characteristics which are highly desirable, if such films are to be used in photoconductive camera tubes. Such conventional films may be prepared on a substrate by such known methods as by the settling of PbO from a solution; by the settling of $PbCO_3$, and subsequently decomposing the film to form the oxide; by the evaporation of Pb in a low pressure atmosphere and subsequently oxidizing the layer; or by the evaporation of Pb in a dry air or oxygen atmosphere. The characteristics of films formed by such conventional methods are not predictable nor under good control. The resistivity and sensitivity of such films at times may be acceptable, but invariably, such films exhibit slow photoconductive decay characteristics. We have found that the yellow or orthorhombic form of PbO exhibits the desired characteristics and we provide a method of making improved photoconductive films consisting essentially of orthorhombic PbO.

An object of our invention is to provide an improved lead oxide photoconductor and method of making.

A further object of our invention is to provide an improved photoconductive film exhibiting high resistivity, rapid rise and decay time with high sensitivity and to provide an improved method of making such a film.

A further object of our invention is to provide an improved yet inexpensive photoconductive film suitable for use in a photoconductive type of camera tube and sensitive to various wave lengths of radiant energy, especially X-radiation and visible light.

Further objects and advantages of our invention will become apparent as the following description proceeds and the features of novelty which characterize our invention will be pointed out with particularity in the claims annexed to and forming part of this specification.

In accordance with a preferred method embodying our invention, a layer of lead oxide is deposited on a heated substrate of a material which does not react with the lead oxide. The conditions of the deposition step are controlled to give the desired mechanical characteristics to the film. The coated substrate is then heated in air or oxygen to a temperature sufficient to convert the PbO of the film to the orthorhombic form and the film is then cooled to room temperature to provide the improved electrical characteristics.

Figure 2:
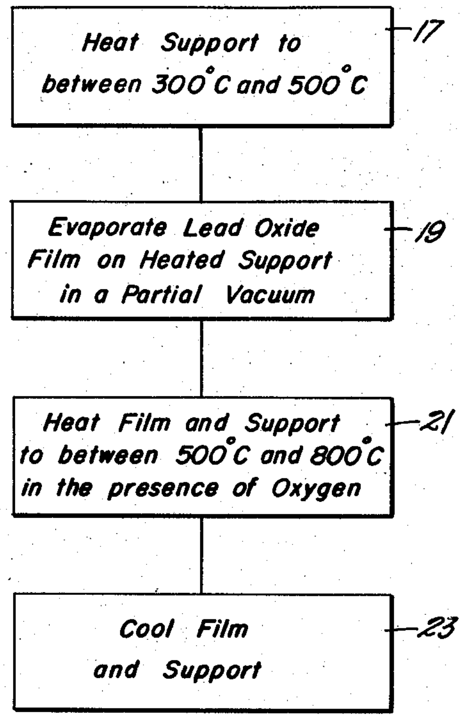

Fig. 1 is an enlarged diagrammatic cross-sectional view of a coated base of the present invention, and Fig. 2 is a flow diagram illustrating a preferred method for coating the base in accordance with the present invention.

The following is a specific example of a preferred embodiment of our invention. A support or substrate for the photoconductive layer in the form of an aluminum sheet is coated with a layer of PbO by evaporation while the substrate is heated to a temperature of 350° C. in an atmosphere of dry oxygen at a pressure of about 5 microns of mercury. For an X-ray sensitive film the coating is applied to a thickness of about 200 microns. The coated substrate is then heated in air to a temperature of 600° C. for a period of two hours. The original evaporated coating of PbO is, under the conditions specified, a mixture of tetragonal or red form of PbO, some orthorhombic PbO and perhaps some $Pb_3O_4$. Upon subsequent heating to 600° C. as specified PbO and $Pb_3O_4$ are converted to the yellow orthorhombic PbO with the resultant improved characteristics as previously discussed. The coating and substrate are then cooled to room temperature. Simple air cooling is satisfactory. There is no need for particularly rapid cooling but, at the same time, it is not desirable to hold the processed film at an elevated temperature for any substantial period of time since cooling at too slow a rate, especially in a region of 400° C. to 500° C., tends to reconvert some of the layer to $Pb_3O_4$.

A consideration of the variations that may be made from the above specific example will serve to provide a better understanding of the nature and scope of our invention. In addition to aluminum such metals as iron and stainless steel may be used as a substrate and also nonmetallic bodies such as ceramics which do not interact with the layer of lead oxide may also be employed. In its broadest aspects the invention may be applied to the formation of pressed self-supporting photoconductive material without a substrate. The particular method employed for obtaining the layer of lead oxide to be converted to the orthorhombic form by the subsequent heating step is important only to the extent that it controls the characteristics of the film which are retained in the converted layer. Evaporation as described in the specific example above provides a mechanically adhering coating with a degree of porosity and agglomeration which is readily controlled and which expedites the subsequent conversion to the yellow form. The substrate temperature has an effect on the graininess or coarseness of the resulting film. Temperatures in the order of 300° C. to 500° C. are satisfactory with the higher temperatures tending to produce graininess which detracts from the power of resolution of the resulting film. While a pressure of 5 microns of oxygen is very satisfactory for depositing the initial layer of lead oxide this pressure is not particularly critical. It is necessary that the pressure of oxygen or the partial pressure of oxygen, if air is used, be above the decomposition pressure of PbO. This pressure would be about one micron. As the pressures are increased the layer gets more fluffy and pressure in the order of 2 millimeters of oxygen represents approximately the upper practical limit of pressure.

The orthorhombic or yellow form of PbO tends to be formed stably at temperatures above 495° C. and temperatures in the range of 525° C. to something less than 888° C., the melting point of PbO, are satisfactory for the conversion step. In many cases, the upper temperature at which the conversion to orthorhombic PbO is carried out is determined by the softening or melting point of the substrate. For example, when aluminum is used the upper limit of the temperature of the conversion step is about 650° C., the melting point of aluminum. The film thickness of 200 microns is suitable for a film for exposure to X-radiation. For visible light a corresponding thickness would be in the order of 5 to 10 microns. The film should be as thin as possible considering the absorption thickness of the radiation to which it is to respond. This facilitates the collection of the electrons liberated by the radiation.

The time of heating determines the percentage of the PbO that is converted to the yellow orthorhombic form. Two hours at 650° C., for example, effects essentially complete conversion. Longer heating times than that required for the complete conversion have no further effect on the film. Shorter heating times tend to produce less than complete conversion and to result in a lesser increase in resistance and a lesser decrease in response time. Accordingly, the minimum heating time, after selection of the temperature to be used, is determined by the electrical characteristics desired. Inasmuch as the conversion can be completed by successive heating steps, the required minimum heating time to obtain the desired characteristics may be established by successive heating operations carried out until the desired characteristics are obtained.

In one instance, where the film was subjected to a conversion temperature of 590° C. in air for one hour, the response time was decreased from six seconds to four and one-half seconds. On subsequently reheating the film at 590° C. for an additional hour, the response time was found to be less than one second, a highly satisfactory response time for photoconductive camera tube use.

The measurements of response time or photoconductive decay time were based on the time required for the photocurrent of a film when utilized with appropriate electrical voltages and exposed to radiant energy to decrease to 25% of its original value upon the removal of the radiant energy excitation.

The increase in resistivity resulting from the conversion to the orthorhombic form of PbO has been by a factor of 10 to 100, resulting in a film with desirable characteristics for charge storage.

In the drawing, Fig. 1 illustrates a support 11 for a film 13 of the orthorhombic form of lead oxide. This film may be obtained in the preferred manner illustrated in the flow diagram of Fig. 2 by heating the support 11 to a temperature between 300° C. and 500° C. (step 17), evaporating a lead oxide film on the heated support 11 in a partial vacuum (step 19), heating the film and support 11 to between 500° C. and 800° C. in the presence of oxygen (step 21), and cooling the film and support 11 (step 23).

Films prepared according to our invention have high resistance and rapid response time and are sensitive to various wave lengths of radiant energy, especially X-radiation and visible light. Therefore, when these films are used in photoconductive camera tubes, potential uses of such tubes are multiplied. For example, photoconductive camera tubes sensitive to visible light can be utilized in various television uses in the entertainment, industrial and teaching fields. Photoconductive camera tubes sensitive to X-radiation can be utilized in industrial X-ray inspection and medical diagnosis. A photoconductive camera tube sensitive to X-radiation, when used in conjunction with a viewing screen, offers many desirable advantages over the present fluoroscopic and radiographic techniques, including instant viewing, remote viewing in daylight and safety hazard elimination, control of picture contrast and brightness and the possibility of a plurality of viewing stations. In addition, photoconductive type of camera tube is relatively inexpensive, simple to operate and produces a good quality picture. The improved characteristics of films prepared in accordance with the present invention enhance the value of camera tubes for these applications.

What we claim as new and desire to secure by Letters Patent of the United States is:

1. The method of forming a photoconductive lead oxide film on a base which comprises forming on said base a layer of lead containing material that will convert to lead oxide upon heating, a substantial percentage of the layer being other than the orthorhombic form of PbO, heating said film to a temperature between 500° C. and 800° C. in the presence of oxygen to transform essentially all of said lead containing material to the orthorhombic form of PbO and subsequently allowing said film to cool to room temperature.

2. The method of forming a photoconductive lead oxide film on a base which comprises heating said base to a temperature between 300° C. and 500° C., evaporating lead oxide on to said base while heated in an oxygen containing atmosphere at low pressure to form a film having a substantial percentage thereof of lead compounds other than orthorhombic PbO, heating said film to a temperature between 500° C. and 800° C. in the presence of oxygen to transform essentially all of said evaporated film to the orthorhombic form of PbO and subsequently allowing said film to cool to room temperature.

3. The method of forming a photoconductive lead oxide film on a metal base which comprises heating said base to a temperature between 300° C. and 500° C., evaporating lead oxide on to said base while heated in an oxygen containing atmosphere at low pressure to form a film, heating said film for a period of about two hours to a temperature between 500° C. and 800° C. in the presence of oxygen to transform essentially all of said evaporated film to the orthorhombic form of PbO and subsequently allowing said film to cool to room temperature.

4. The method of forming a photoconductive lead oxide film on a base which comprises heating said base to a temperature of about 350° C., evaporating lead oxide on to said base while heated in an oxygen containing atmosphere at low pressure to form a film, heating said film to a temperature of about 600° C., in the presence of oxygen to transform essentially all of said evaporated film to the orthorhombic form of PbO and subsequently allowing said film to cool to room temperature.

5. A photoconductive device comprising a conductive layer and an adhering body of material consisting essentially of orthorhombic PbO having a bulk resistivity in excess of $10^{11}$ ohm centimeters.

6. The method of forming a photoconductive lead oxide film on a base which comprises forming a layer of lead oxide on the base, a substantial percentage of the layer being other than the orthorhombic form of PbO, heating the layer and base to a temperature between 500° C. and 800° C. in the presence of oxygen to transform essentially all of the lead oxide to the orthorhombic form of PbO, and subsequently cooling the layer and base to room temperature.

7. The method of forming a photoconductive lead oxide film on a base which comprises forming a layer of material on the base wherein the material is from the group of lead oxide and lead carbonate, heating the layer to a temperature between 500° C. and 800° C. in the presence of oxygen to transform essentially all of the material to the orthorhombic form of PbO, and subsequently cooling the layer and base to room temperature.

References Cited in the file of this patent

UNITED STATES PATENTS

| | | |
|---|---|---|
| 2,169,840 | Lewis | Aug. 15, 1939 |
| 2,211,145 | Miller | Aug. 13, 1940 |
| 2,790,736 | McLaughlin et al. | Apr. 30, 1957 |

FOREIGN PATENTS

| | | |
|---|---|---|
| 249,809 | Great Britain | Jan. 31, 1927 |
| 501,175 | Great Britain | Feb. 22, 1939 |